United States Patent [19]

Sato et al.

[11] 4,222,060

[45] Sep. 9, 1980

[54] INK JET PRINTING APPARATUS

[75] Inventors: Tsutomu Sato; Takuro Isayama, both of Tokyo, Japan

[73] Assignee: Ricoh Company, Ltd., Tokyo, Japan

[21] Appl. No.: 962,211

[22] Filed: Nov. 20, 1978

[51] Int. Cl.$^2$ ............................................. G01D 15/18
[52] U.S. Cl. ............................................... 346/140 R
[58] Field of Search ............................. 346/75, 140 R

[56] References Cited

U.S. PATENT DOCUMENTS

| B 512,964 | 2/1976 | Wiesmuller et al. | 346/75 |
| 3,747,120 | 7/1973 | Stemme | 346/75 |

FOREIGN PATENT DOCUMENTS 1012198  6/1977  Canada ................................ 346/140 R Primary Examiner—George H. Miller, Jr.
Attorney, Agent, or Firm—David G. Alexander

[57] ABSTRACT

An ink jet head (47) is moved relative to a recording surface (11). Print signals are applied to the ink jet head (47) from a computer or the like (22) causing the ink jet head (47) to eject ink onto the recording surface (11). The amount of ink ejected and thereby the density of printing correspond to the magnitudes of the print signals. The ejection velocity of the ejected ink increases with the magnitudes of the print signals. The timing of ink ejection is adjusted in accordance with the magnitudes of the print signals in such a manner that the ejected ink is incident on the printing surface (11) at a same position at all velocities of ink ejection.

8 Claims, 4 Drawing Figures

INK JET PRINTING APPARATUS

BACKGROUND OF THE INVENTION

The present invention relates to an ink jet printing apparatus for a computer, facsimile transceiver or the like. The apparatus is constructed to print alphanumeric characters, graphic designs or any other type of desired pattern in response to applied electric signals.

A printing apparatus of this type comprises an ink ejection head which is moved relative to a printing surface such as a sheet of paper in an orthogonal scanning pattern. Electrical signals in the form of pulses are applied to the head to cause ink ejection from the head onto the paper. The signals correspond to the pattern to be printed. Each pulse causes ejection of one drop of ink onto the paper to print one dot.

In order to print various shades of gray rather than just black and white, the head is constructed in such a manner that the amount of ink ejected and therefore the density of the printed dot varies in accordance with the magnitude of the corresponding applied pulse. The larger the magnitude of the pulse the greater the amount of ink ejected.

However, due to the basic design of the ink ejection head the velocity of the ejected ink also increases with the applied signal magnitude. In other words, the ink leaves the head at a greater initial velocity for high signal levels than for low signal levels. At the maximum signal level, the high velocity ink will be incident at a second point on the paper which is downstream of the first point in the direction of movement of the head. The reason is that the low velocity ink takes longer to reach the paper than the high velocity ink and that the ink has a transverse velocity component in addition to a normal velocity component. The normal velocity component increases with the magnitude of the applied pulse and is due to the force of ejection of the ink from the head. The transverse velocity component is substantially constant and is due to the movement of the head. The displacement of the printed dot from the ejection position of the head is substantially equal to the time of flight of the ink from the head to the paper multiplied by the velocity of movement of the head.

This effect is undesirable, especially in a facsimile transceiver or the like since it produces a distorted printed pattern. The position of a particular dot on the paper is a function of the density of the dot whereas the position of the dot should be the same regardless of the density of the dot.

The distortion caused by this effect is even more undesirable in a color ink jet printer which comprises three ink ejection heads for ejecting ink of three primary colors. A dot of the desired color and density is produced by superimposing three dots of the primary colors from the respective ink jet heads. However, since the magnitudes of the pulses applied to the ink jet heads and thereby the velocities of ink ejection will be different for the three respective colors, the primary color dots will not be superimposed on each other but will be displaced from each other in the direction of movement of the heads. The result is not only positional distortion but also color distortion.

SUMMARY OF THE INVENTION

An ink jet printing apparatus embodying the present invention includes an ink jet head movable relative to a printing surface and signal generating means for generating a print signal of fixed duration causing the ink jet head to eject an amount of ink onto the printing surface corresponding to a magnitude of the print signal, a velocity of the ejected ink also corresponding to the magnitude of the print signal. Gate means gate the print signal to the ink jet head. Gate pulse generating means generate a gate pulse of fixed duration causing the gate means to be enabled to gate the print signal therethrough, the duration of the gate pulse being shorter than the duration of the print signal.

Control means variably control the gate pulse generating means to generate the gate pulse at a time after initiation of the print signal which corresponds to the magnitude of the print signal in such a manner that the ejected ink is incident on the printing surface at a same position at all magnitudes of the print signal.

It is an object of the present invention to provide an ink jet printing apparatus which prints a dot on a printing surface at a same position regardless of the density of the dot.

It is another object of the present invention to provide an ink jet printing apparatus which eliminates a major cause of distortion inherent in prior art apparatus.

It is another object of the present invention to provide an ink jet printing apparatus which produces undistorted reproductions in both black and white and color.

It is another object of the present invention to provide a generally improved ink jet printing apparatus.

Other objects, together with the foregoing, are attained in the embodiment described in the following description and illustrated in the accompanying drawing.

DESCRIPTION OF THE PREFERRED EMBODIMENT

While the ink jet printing apparatus of the present invention is susceptible of numerous physical embodiments, depending upon the environment and requirements of use, substantial numbers of the herein shown and described embodiment have been made, tested and used, and all have performed in an eminently satifactory manner.

Figure 1:
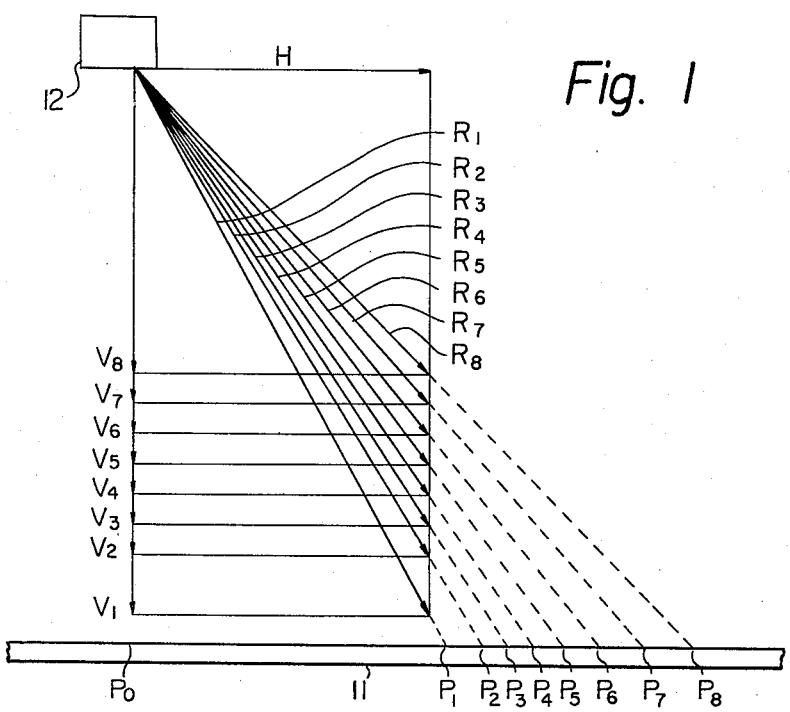
FIGS. 1 and 2 are diagrams illustrating the principle of the present invention.

Referring now to FIG. 1 of the drawing, an ink ejection head 12 is moved parallel to a printing surface in the form of a sheet of paper 11 at a velocity H. The head 12 is designed to eject ink perpendicularly (normally) onto the paper 11 in response to electrical pulse signals to form dots. The higher the magnitude of an applied signal, the greater the amount of ink ejected, the greater the density of the dot and also the greater the initial velocity of the ink toward the paper 11. In the illustrated example, the pulses may have eight different magnitudes and thereby produce eight different ink dot densities. While the transverse component of the initial velocity of the ink ejected from the head 12 is constant at the velocity H of movement of the head 12, the normal component of the initial velocity may have eight different values, V1 to V8, with V1 being the largest and corresponding to maximum pulse magnitude and ink dot density. The transverse and normal velocity components combine to produce respective initial velocity vectors R1 to R8.

At the maximum normal velocity V1, the ink will be incident on the paper 11 at a point P1. At the minimum normal velocity V8 the ink will be incident on the paper 11 at a point P8 which is displaced from the point P1 in the direction of movement of the head 12. This is because at the low normal velocity V8 the ink takes longer to reach the paper 11 and travels transversely further during the time of flight. At the normal velocities V2 to V7 the ink is incident on the paper 11 at intermediate points P2 to P7 respectively. The displacement of the point of incidence of the ink on the paper 11 from a point of ejection P0 is substantially equal to the time of flight of the ink multiplied by the horizontal velocity component H.

Figure 2:
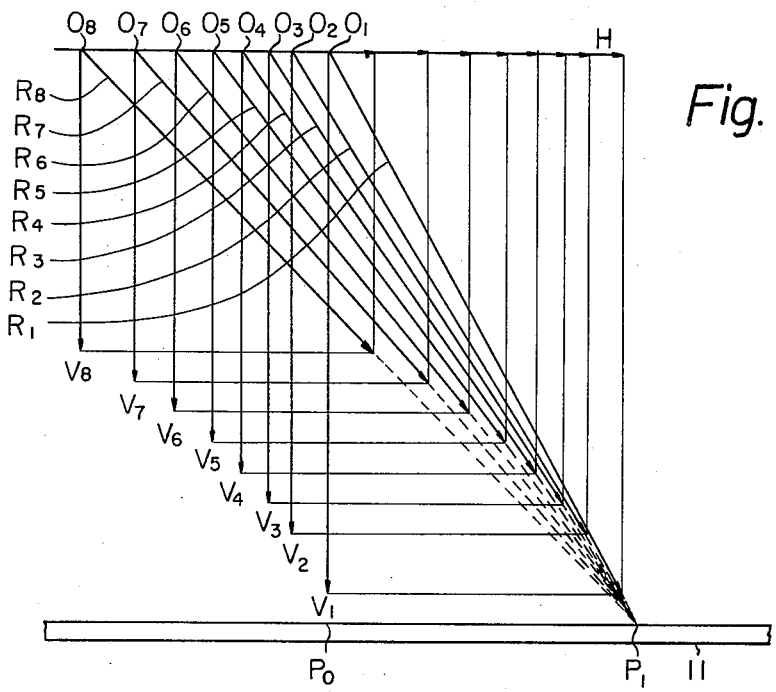

From the illustration of FIG. 1 it will be understood how, in prior art apparatus, the position of a dot of ink on a printing surface is a function of the density of the dot. The manner in which this problem is overcome in accordance with the present invention is illustrated in FIG. 2.

In this example, the ink is incident on the paper 11 at the point P1 at all ejection velocities. However, the ink is ejected from the head 12 at a point 01 which corresponds to the point P0 only when the normal velocity is V1. At the velocity V2, the ink is ejected at a point 02 which is spaced by a distance P2-P1 upstream of the point 01. At the velocity V3 the ink is ejected at a point 03 which is spaced upstream of the point 01 by a distance P3-P1. Similar relationships hold true for the other velocities V4 to V8. By varying the ink ejection timing in this manner, the ink is always incident on the paper 11 at the point P1.

Figure 3A:
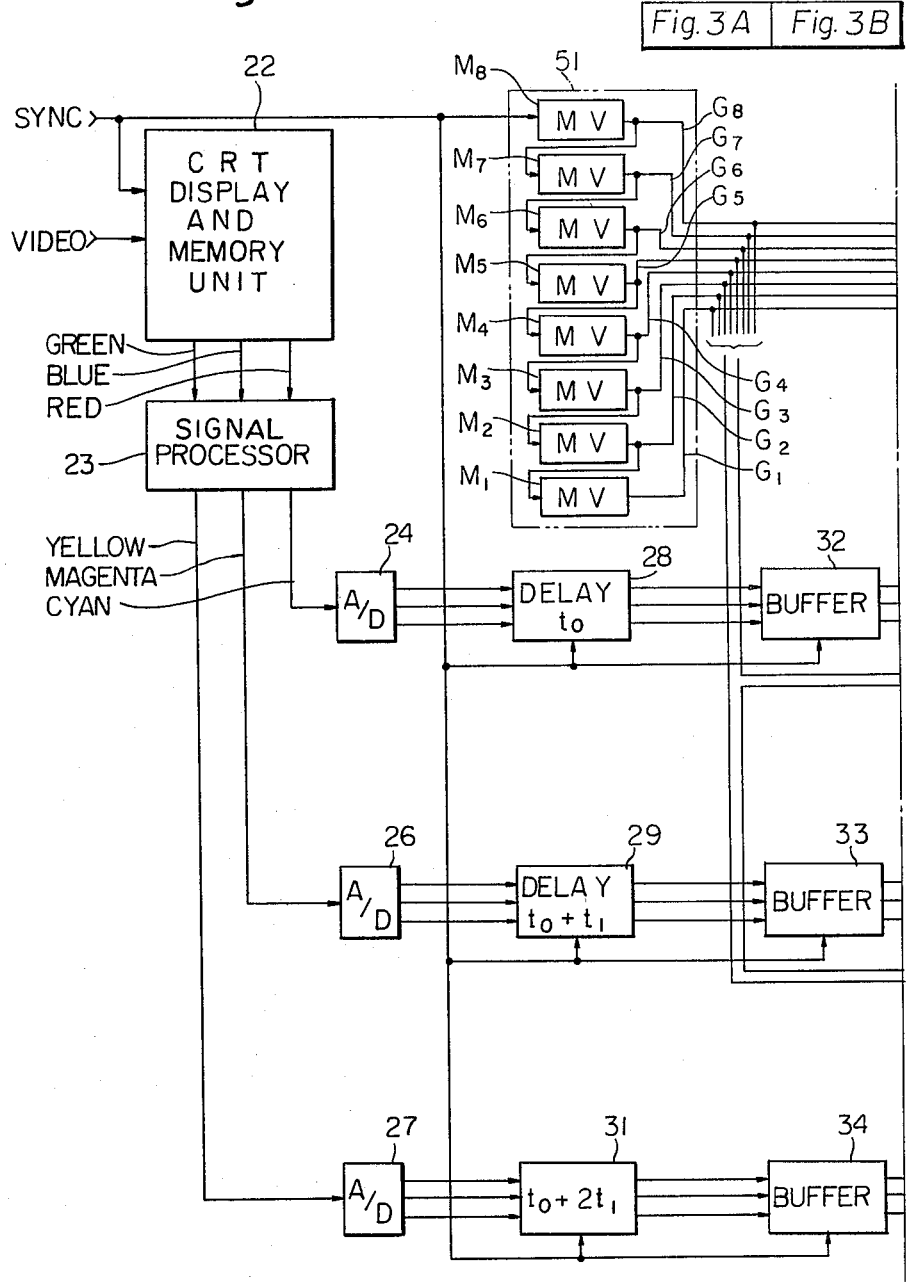
FIG. 3 is an electrical schematic diagram, partially in block form, of an ink jet printing apparatus embodying the present invention.
Figure 3B:
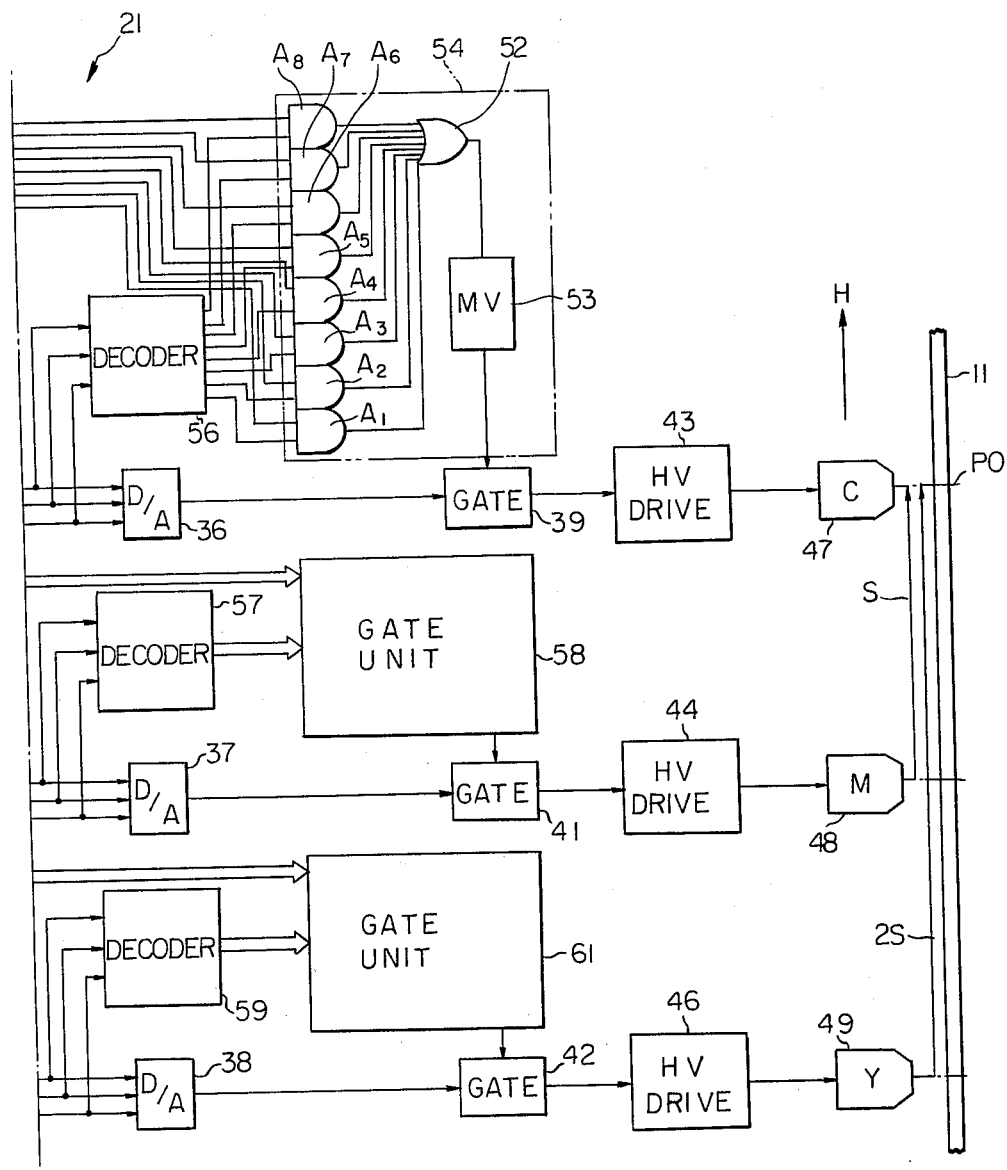
Figure 4:
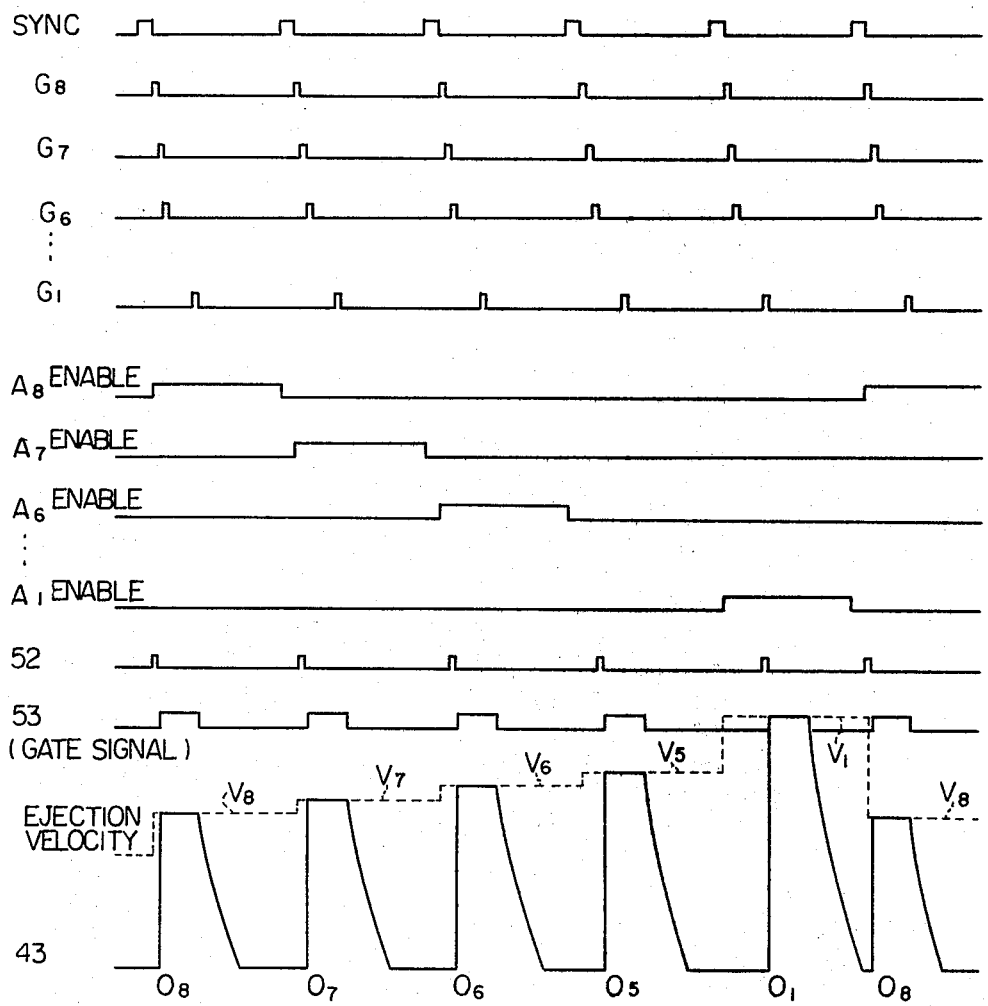
FIG. 4 is a timing diagram illustrating the operation of the present ink jet printing apparatus.

Referring now to FIG. 3 of the drawing, an ink jet printing apparatus embodying the present invention is generally designated by the reference numeral 21. A timing diagram of the apparatus 21 is illustrated in FIG. 4.

The apparatus 21 comprises a signal generating device which is constituted in the present example by a CRT display and memory unit 22. The unit 22 typically comprises a CRT screen for displaying a full color graphic pattern and a random access memory for storing the individual data signals which represent the pattern. The pattern is input to the unit 22 as a VIDEO signal train. SYNC signals are applied to the unit 22 to sequentially address the locations in the memory to read and write the data signals.

The unit 22 produces three signal trains for green, blue and red color components of the pattern which are applied to a signal processor 23. The signal processor 23 produces three print signal trains for the complementary colors yellow, magenta and cyan in analog form and feeds the same to analog-to-digital converters 24, 26 and 27 respectively. The converters 24, 26 and 27 convert the analog print signals into 3-bit digital signals and apply the same through delay units 28, 29 and 31 to buffers 32, 33 and 34 respectively. The digital print signals are converted back to analog form by digital-to-analog converters 36, 37 and 38 and fed through gates 39, 41 and 42 to high voltage drive units 43, 44 and 46 respectively. The units 43, 44 and 46 amplify the print signals and apply the same to oscillators of ink jet printing heads 47, 48 and 49 respectively. The heads 47, 48 and 49 are constructed to eject cyan, magenta and yellow ink onto the paper 11 in response to the respective print signals.

The heads 47, 48 and 49 are integrally mounted together and moved at the velocity H parallel to the paper 11. However, the head 48 is spaced upstream from the head 47 by a distance S and the head 49 is spaced upstream from the head 47 by a distance 2S.

The delay unit 28 delays the cyan print signal by a time t0 which is sufficient to load the buffer 32 and perform other operations which will be described in detail below. The delay unit 29 delays the magenta print signal by a time t0+t1. The time t1 is calculated so that the magenta dot will be superimposed on the cyan dot and is equal to the distance S divided by the velocity H. In other words, the time t1 is that required for the head 48 to travel the distance S after ejection by the head 47. The delay unit 31 provides a delay equal to t0+2t1 to allow the head 49 to travel the distance 2S and print the yellow dot on top of the cyan and magenta dots.

The apparatus 21 further comprises a pulse generator unit 51 comprising eight monostable multivibrators or pulse generators M1 to M8. The output of the multivibrator M8 is connected to the input of the multivibrator M7. The multivibrators M8 to M1 are connected in series so that the output of one multivibrator is connected to the input of the next multivibrator. The multivibrator M8 is triggered by the trailing edge of the SYNC pulse. The multivibrator M7 is triggered by the trailing edge of an output pulse G8 of the multivibrator M8. The multivibrators M6 to M1 are triggered by the trailing edges of output pulses G7 to G2 of the multivibrators M7 to M2 respectively. The multivibrator M1 produces an output pulse G1.

The outputs of the multivibrators M8 to M1 are connected to inputs of AND gates A8 to A1 respectively. The outputs of the AND gates A8 to A1 are connected to inputs of an OR gate 52, the output of which is connected to an input of a monostable multivibrator 53. The output of the multivibrator 53 is connected to an input of the gate 39 which is constituted by an AND gate. The AND gates A8 to A1, OR gate 52 and multivibrator 53 constitute a gate unit 54.

The output of the buffer 32 is connected to an input of a decoder 56, outputs of which are connected to inputs of the AND gates A8 to A1 respectively.

In operation, the SYNC pulse triggers the multivibrator M8 which produces the pulse G8 which is applied to the AND gate A8. The multivibrators M7 to M1 produce the pulses G7 and G1 in sequence following the pulse G8 as illustrated in FIG. 4 which are applied to the AND gates A7 to A1 respectively.

The output of the buffer 32 is a 3-bit digital signal representing the magnitude of the cyan print signal. The 3-bit format allows eight discrete magnitudes. The signal from the buffer 32 is decoded by the decoder 56 which enables only one of the AND gates A8 to A1. The AND gate which is enabled is the one which corresponds to the magnitude of the cyan print signal. For example, if the number in the buffer is five (binary 101), the decoder 56 will produce a high output to enable the AND gate A5. None of the signals G1 to G4 and G6 to G8 will be gated through the respective AND gates because only the AND gate A5 is enabled by the decoder 56. The pulse signal G5 is gated through the AND gate A5 and OR gate 52, the trailing edge of the pulse G5 triggering the multivibrator 53 which produces a gate pulse signal. The gate signal enables the gate 39 to gate the cyan print signal therethrough for the duration of the gate signal. The cyan print signal gated through the gate 39 is applied to the drive unit 43 which energizes the head 47 for ink ejection for the duration of the gate pulse.

The operation of the apparatus 21 for the eight different velocities V1 to V8 is illustrated in FIG. 4. For the velocity V8, the cyan print signal has the lowest magnitude and the AND gate A8 is enabled by the decoder 56. The pulse G8 is gated to the multivibrator 53 to generate the gate signal. Since the pulse G8 occurs earlier in time than any of the other pulses G7 to G1, the head 47 will be energized at the earliest possible time to eject the ink onto the paper 11. The time of generation of the pulse G8 is selected to allow ink to travel from the point 08 to the point P1 on the paper 11 after ejection from the head 47.

For the velocity V1, the cyan print signal has its maximum magnitude and the decoder 56 enables the AND gate A1. Thus, the pulse G1 is gated to the multivibrator 53 to generate the gate signal. In this case, the pulse G1 is produced later in time than any of the pulses G2 to G8 and energizes the head 47 at the latest possible time. Thus, ink ejection is performed at the point 01. The operation for the other velocities V2 to V7 is intermediate between that for the velocities V1 and V8 in the manner illustrated in FIG. 4.

It will be noted that the time duration of the gate signal must be shorter than the duration of the print signal, and that the gate signal is produced in response to the initiation of the print signal, which occurs at the trailing edge of the SYNC signal. The durations of the print and gate signals are fixed. However, the gate signal is produced at a variable time after initiation of the print signal. It is another requirement of the present apparatus 21 that the gate signal be generated within the duration of the print signal.

Although not illustrated or described in detail, the apparatus 21 further comprises decoders 57 and 59 for the magenta and yellow channels which are identical to the decoder 56 for the cyan channel and gate units 58 and 61 for the magenta and yellow channels which are identical to the gate unit 54, for the cyan channel.

The time at which the gate signal must be produced so that the ink dot is always printed at the same point on the paper 11 varies as a non-linear function of the level of the print signal. Thus, the durations of the pulses G1 to G8 are designed to have different values. A duration of the pulse G8 is selected to be sufficient to allow the print signal to be latched into the buffer 32. The duration of the pulse G7 is selected to that the trailing edge thereof will occur when the head 47 is at the point 02. Thus, the duration of the pulse G7 is equal to (02-01)/H. The durations of the pulses G6 to G1 are equal to (03-02)/H, (04-03)/H, (05-04)/H, (06-05)/H, (07-06)/H and (08-07)/H respectively.

In summary, it will be seen that the present invention overcomes the drawbacks of the prior art and provides an ink jet printing apparatus which eliminates positional and color distortion by printing a dot in a same position regardless of the density of the dot.

Various modifications will become possible for those skilled in the art after receiving the teachings of the present disclosure without departing from the scope thereof. For example, although the present invention has been illustrated and described in the form of the three color ink jet printing apparatus 21, it is of course within the scope of the present invention to embody the principles thereof in a single color (black and white) printing apparatus or a printing apparatus which prints in two or more than three colors. As yet another modificaton, the ink ejection head or heads may be fixedly mounted and the paper moved relative thereto.

What is claimed is:

1. An ink jet printing apparatus including an ink jet head movable relative to a printing surface and signal generating means for generating a print signal of fixed duration causing the ink jet head to eject an amount of ink onto the printing surface corresponding to a magnitude of the print signal, a velocity of the ejected ink also corresponding to the magnitude of the print signal, characterized by comprising:
   gate means for gating the print signal to the ink jet head;
   gate pulse generating means for generating a gate pulse of fixed duration causing the gate means to be enabled to gate the print signal therethrough, the duration of the gate pulse being shorter than the duration of the print signal; and
   control means for variably controlling the gate pulse generating means to generate the gate pulse at a time after initiation of the print signal which corresponds to the magnitude of the print signal in such a manner that the ejected ink is incident on the printing surface at a same position at all magnitudes of the print signal.

2. An apparatus as in claim 1, in which the gate pulse generating means comprises first and second pulse generators, the first pulse generator being triggered in response to initiation of the print signal to generate a first pulse, the second pulse generator being triggered in response to termination of the first pulse to generate a second pulse, the pulse generating means further comprising first and second gates having inputs connected to outputs of the first and second pulse generators respectively, the control means enabling the first gate or the second gate in accordance with the magnitude of the print signal.

3. An apparatus as in claim 2, in which the gate pulse generating means further comprises a gate pulse generator having an input connected to outputs of the first and second gates and an ouput connected to an input of the gate means, the gate pulse generator being triggered to generate the gate pulse in response to the first or second pulse gated thereto by the first or second gate respectively.

4. An apparatus as in claim 3, in which the first and second pulses have different durations.

5. An apparatus as in claim 3, in which the first and second gates are AND gates, the gate pulse generating means further comprising an OR gate having inputs connected to outputs of the first and second gates respectively and an output connected to the input of the gate pulse generator.

6. An apparatus as in claim 2, in which the control means comprises sensor means for sensing the magnitude of the print signal.

7. An apparatus as in claim 6, in which the signal generating means generates the print signal in analog form, the sensor means comprising an analog-to-digital converter for converting the print signal to digital form and a decoder having an input connected to an output of the analog-to-digital converter and first and second outputs connected to inputs of the first and second gates respectively.

8. An apparatus as in claim 6, further comprising delay means connected between the signal generating means and the gate means, the sensor means being connected to an output of the delay means, the delay means delaying the print signal for a fixed time duration.

* * * * *